3,421,628
APPARATUS FOR PROCESSING A SOLUTION BY
REVERSE OSMOSIS
Jean-Louis Barnabe, Noisy-le-Sec, Dominique Callies, Neuilly-sur-Seine, and Jean-Claude Cornier, Paris, France, assignors to Societe de Recherches Techniques et Industrielles (S.R.T.I.), Boulogne, Hauts-de-Seine, France
Filed Dec. 15, 1966, Ser. No. 601,990
Claims priority, application France, Feb. 15, 1966, 49,586
U.S. Cl. 210—134     12 Claims
Int. Cl. B01d 13/00

ABSTRACT OF THE DISCLOSURE

A reverse osmosis desalination device having a manually operated pump and a gas filled flexible bag co-operating to produce reverse osmosis across plural membranes. Another embodiment features a breakable capsule containing a gas producing agent.

---

The present invention relates to an apparatus for processing a solution by reverse osmosis, said apparatus being especially although not exclusively intended for the production of drinking water from water which is unfit for drinking and especially from sea water, polluted or brackish water and so forth.

The theory of osmosis or preferential transfer which takes place through membranes or porous barriers is well known both as a result of practical experiments and calculations. It is thus known that the interposition of a barrier of this type between two liquids, one of which is a solvent in a practically pure state and the other is a binary compound of said solvent and of a substance dissolved in this latter, results in a double diffusion which tends to cause the unbalance of the system to disappear by equalizing the concentrations on each side of the barrier. The dissolved substance diffuses towards the pure solvent whilst a proportion of the molecules of said solvent has a tendency to pass through the porous barrier. However, in certain cases, it does happen that the velocity of transfer of the dissolved substance through the porous barrier is zero, in which case a barrier of this type constitutes a semipermeable wall. Under these conditions, only the dissolved substance passes from the solvent to the solution, thus producing on the solution side a rise in hydrostatic pressure which progressively increases up to the moment when the pressure difference on each side of the semipermeable wall reaches a sufficient value to prevent the further passage of the solvent towards the solution. Equilibrium is thus attained, the hydrostatic pressure within the solution being equal to what is known as the osmotic pressure.

It is also known that semiporous barriers or membranes of the type referred to above can also be made to operate in reverse osmosis, that is to say by causing the solvent contained in the solution to pass through such membranes in the direction of the pure solvent, namely, in the direction opposite to that of the natural process. It is in that case necessary to generate on that face of the membrane which is in contact with the solution a pressure which is higher than the osmotic pressure hereinabove defined. In the case in which the process of reverse osmosis is applied to the desalination of sea water, the osmotic pressure of which is of the order of 350 p.s.i., it is necessary to utilize working pressures of the order of 1000 to 1400 p.s.i. in order to obtain a suitable specific flow of fresh water through the membrane.

The aim of this invention is to provide a lightweight apparatus of small overall size, the operation of which is very simple, and which permits the processing of a solution and especially a saline solution of sea water or of brackish water for the purpose of producing fresh water, this process being therefore of special interest for the equipment of lifeboats, aircraft and so forth.

To this end, the apparatus according to the invention is characterized in that it comprises a closed vessel, a reservoir for the solution to be processed, a mechanism for admitting said solution into the vessel under pressure, a compressible system for accommodating the corresponding increase in volume within said vessel and bringing the pressure within said vessel to a stable operating value, a plurality of semipermeable membranes in contact with said solution within said vessel and a fluid circuit for the recovery and discharge of the processed solution after the passage thereof through said membrane.

An apparatus as constructed according to the invention is additionally characterized by a number of different features which are preferably utilized at the same time but which may if necessary be applied separately and which relate in particular to the arrangements outlined hereunder:

Said vessel is constructed in two sections in inter-fitting relation in order to permit the assembly of the membranes and different components of the apparatus;

Said vessel is traversed by a central guide tube which forms a leak-tight cylinder for a piston which penetrates into said guide tube at one end thereof and which can be operated by hand by any suitable means, said guide tube being closed at the other end thereof by a seal plug provided with an internal duct through which said guide tube is caused to communicate with the interior of said vessel in order to permit the admission of the solution to be processed into said vessel under the action of said piston;

A communication between said guide tube and said reservoir for the solution to be processed is established through said piston by means of at least one nonreturn valve;

Said guide tube contains a cartridge formed of a substance which reacts with said solution to be processed and which generates an appreciable quantity of gas, said cartridge being enclosed in a matrix which is designed to fracture under the action of said piston;

Said compressible system is constituted by a leak-tight bag formed of flexible material housed within said vessel and filled with a neutral gas under pressure;

Said bag is placed against the internal wall of said vessel and held in position laterally by means of a cylindrical shell which serves as a lining of said wall;

Said shell is pierced by holes of small diameter for establishing a communication between said vessel and the space which is formed between said shell and the vessel wall and which contains said leak-tight bag;

Said bag is fitted with a filling valve through which said neutral gas is introduced through the wall of said vessel;

Said neutral gas under pressure has a saturated vapor pressure at ambient temperature corresponding to the pressure which is necessary for initiating reverse osmosis of the solution to be processed through said porous membranes;

Said neutral gas is constituted by a mixture of a condensable gas and/or a noncondensable gas under the usual conditions of utilization of the apparatus;

Said vessel is provided with an opening for discharging the solution to be processed, said opening being closed by a plug which may be fitted if necessary with an adjustable leakage nozzle;

Said membranes are mounted on porous supports and associated in pairs with their supports in oppositely facing relation, a space being formed between said supports for the recovery of the processed solution which has passed through said membranes;

Said membrane are stacked inside said vessel and keyed on the outer surface of the central guide tube, O-ring seals being provided to ensure leak-tightness between said membranes, said guide tube and the spaces formed between the membrane supports with respect to the solution to be processed;

Said membranes are set in staggered relation with respect to the axis of the central guide tube in such a manner as to form therebetween a staggered passageway for the solution to be processed which is contained in said vessel;

Said spaces formed between the membrane supports are adapted to communicate with longitudinal grooves machined in the outer surface of said guide tube, said grooves being adapted to open into a channel for collecting the processed solution which passes through the vessel wall.

In addition to the features outlined above, an apparatus as constructed according to the invention has further characteristic arrangements which will appear from the following description in connection with one example of construction which is given solely by way of indication and not in any limiting sense.

Figure 1:
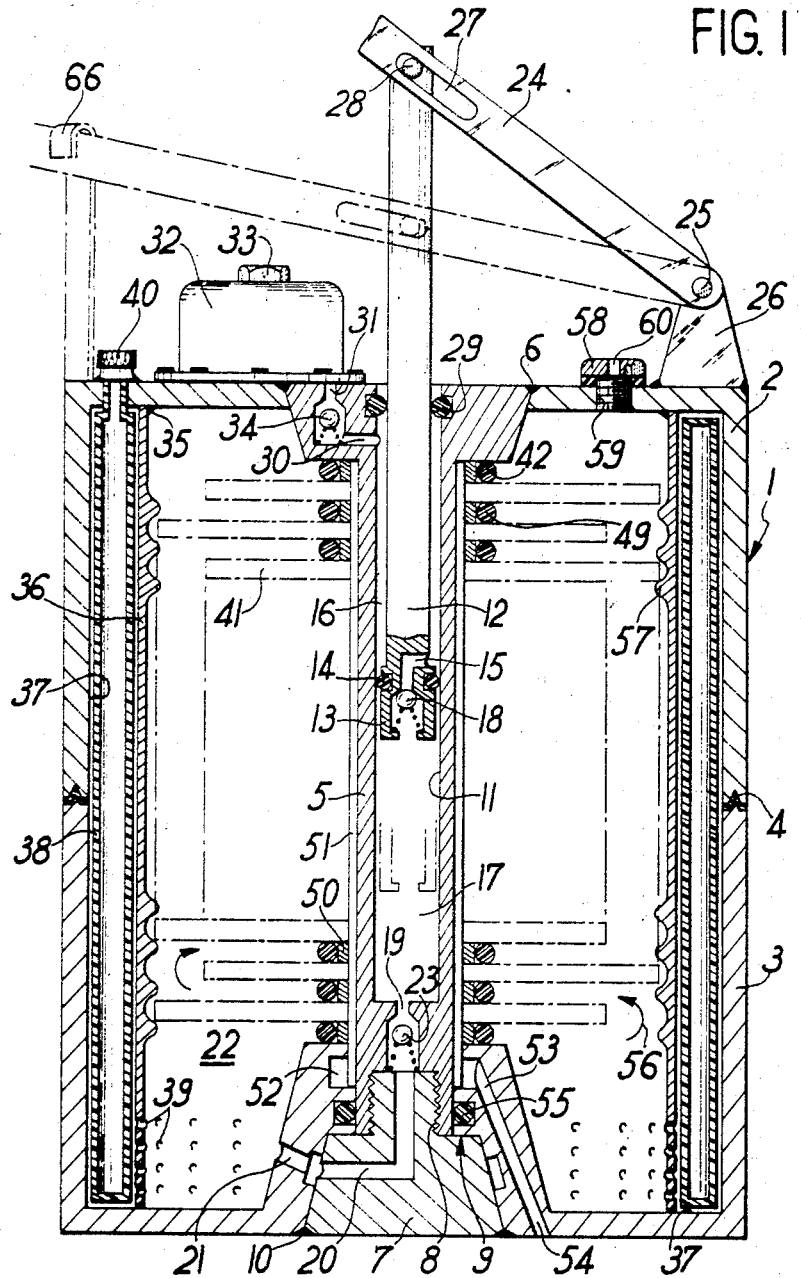
FIG. 1 is a diagrammatic vertical sectional view of an apparatus for processing a solution as constructed according to the invention.

From FIG. 1, it is seen that the apparatus comprises a vessel 1 of generally cylindrical shape comprising two end sections 2 and 3 which are adapted to engage one inside the other with interposition of a seal 4. The end section 2 of the vessel is provided axially with a central guide tube 5 which is made integral with the vessel by means of a weld bead 6. The lower end of said guide tube can be sealed off by means of a plug 7 which is screwed into the guide tube at 8 and applied against an annular shoulder 9 of the second end section 3 of the vessel, thereby effecting the assembly of said second end section. A weld bead 10 is formed for the purpose of securing the seal plug 7 in position with respect to the vessel in order to maintain leak-tightness of the vessel when the assembly of the various vessel components has been completed.

The guide tube 5 is provided internally with a cylindrical bore 11 in which is mounted a rod 12 terminating at the lower end thereof in a piston 13 fitted with a packing ring 14 which is applied against the internal surface of the guide tube, said guide tube being thus designed to form a cylinder for said piston. A duct 15 is formed through the rod 12 and the piston 13 in such a manner as to provide a communication between the annular space 16 formed between the rod 12 and the guide tube 5 on the one hand and the chamber 17 formed inside said guide tube between the piston 13 and the end plug 7 on the other hand. A spring-loaded ball valve 18 is mounted in the interior of the piston 13 and normally closes off the duct 15. Finally, there is formed in the lower portion of the guide tube 5 an opening 19 providing a communication with a duct 20 which is machined in the interior of the seal plug 7; said duct 20 is located in opposite-facing relation with a passageway 21 formed in the end section 3 of the vessel when the seal plug 7 is screwed into the guide tube to a suitable extent, as shown in the drawing. The opening 19, duct 20 and passageway 21 thus serve to establish a communication between the chamber 17 located beneath the piston 13 and the internal region of the vessel 1 which is generally designated by the reference numeral 22. A second spring-loaded ball-valve 23 is mounted beneath the guide-tube opening 19 so as to close off said opening at any particular moment during the operation of the apparatus which will be described hereinafter.

The displacement of the rod 12 and of its piston 13 inside the guide tube 5 is carried out by means of a lever 24 which is pivoted about a pin 25 carried by a bracket 26 which is secured to the end section 2 of the vessel. Said lever is provided with an elongated slot 27 which is adapted to cooperate with a stud 28 carried by the rod 12; by virtue of this simple arrangement, the displacements of the lever result in a vertical translational movement of the rod 12 either upwards or downwards within the guide tube. Leak-tightness during this movement is ensured by means of a packing ring 29 which is fitted in a channel machined in the end of the guide tube 5 and which is applied against the rod 12. It is apparent that any other suitable mechanical arrangement for controlling the displacement of the rod 12 could be contemplated without thereby departing from the scope of the present invention such as, in particular, a foot pedal actuated directly by the operator.

The annular space 16 formed inside the guide tube 5 around the rod 12 between the packing rings 14 and 29 communicates by way of a duct 30 machined in the guide tube with an outlet 31 which is connected to a reservoir 32 containing a given volume of the solution to be processed within the apparatus. It will be understood that any design can be contemplated for the reservoir 32, which can consist of a simple vessel made of metal or any other suitable material, or even a flexible bottle which contains the solution. In the example of construction under consideration, the vessel is in the form of a metallic bell provided at the top with a filler cap 33. A third spring-loaded ball-valve 34 is provided inside the duct 30 so as to close off the opening 31 at any particular moment during operation of the apparatus.

A cylindrical shell 36 which forms a lining of the side wall of the vessel is fixed inside the vessel 1 by means of a weld fillet 35. There is thus formed between said vessel wall and the outer surface of said shell a space 37 which is reserved for the purpose of placing therein a bag or pouch 38 of flexible material such as natural rubber. The shell 36 is pierced at the bottom by a number of holes 39 of small diameter which provide a communication between the region 22 and the space 37. In addition, the inner surface of the shell 36 is provided with transverse ribs 57 which project inwards in region 22 of the vessel and the function of which is primarily to increase the mechanical strength of the shell and also to permit of better positioning of the semipermeable membranes of the apparatus as described hereinafter. The bag 38 is fitted with a valve 40 which is perfectly leak-tight and permits the filling of the bag either with neutral gas or with a mixture of gases under pressure through the vessel wall.

Figure 2:
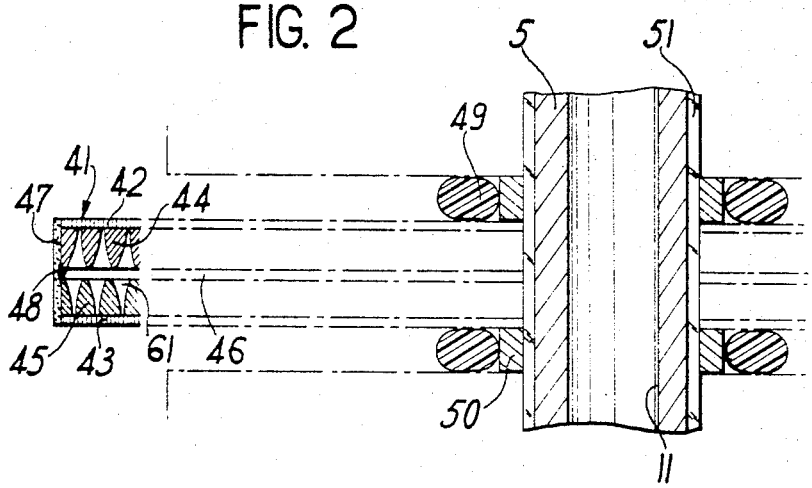
FIGS. 2 and 3 are views on different scales showing details of FIG. 1.

The semipermeable membranes of the apparatus which permit of processing of the solution in reverse osmosis, especially for the production of fresh water, form part of an assembly of parallel elements such as the element 41. The constructional design and assembly of said elements 41 within the interior of the vessel 1 are illustrated on a larger scale in FIG. 2. The mode of assembly and constructional design referred to are preferably identical with those which were previously described in U.S. Patent No. 3,344,926. Each element is made up of two semipermeable porous membranes 42 and 43 which are mounted in parallel relation, each membrane being fixed on a porous support 44 or 45. There is thus formed between the two associated supports a transverse gap 46 which serves for the recovery of the solution which has passed through the membranes. The two membranes 42 and 43 and their supports 44 and 45 are joined together at each lateral extremity by means of a coupling member 47 which is either welded or bonded, thereby ensuring leak-tightness between the gap 46 on the one hand and the region 22 of the vessel 1 on the other hand. As an advantageous feature, the two supports 44 and 45 are welded together at 48 and are provided with transverse holes 61 of flared shape whereby the membranes and the common intermediate gap are put into communication with each other through said supports.

The different assemblies 41 which are constructed as indicated in the foregoing are stacked in parallel relation on the central guide tube 5 of the vessel. Leak-tightness from one assembly 41 to the next is ensured by means of O-ring seals 49 held in position by spacer rings 50 which are mounted around the guide tube 5. The gaps 46 open into longitudinal grooves 51 which are machined in the outer surface of the guide tube 5 and which extend over the major part of its length, leak-tightness being ensured as stated above by means of the seals 49 which prevent any direct passage between the region 22 and the grooves 51. At the bottom of the guide tube 5, said grooves 51 open into a circular channel 52 which in turn communicates with a duct 53 formed within the thickness of the vessel end section 3 and having its opening at 54 on the outer end face of this latter. An O-ring seal 55 is mounted between the guide tube 5 and the end section 3 in order to provide leak-tightness beyond the channel 52 once the seal plug 7 has been fitted in position.

Figure 3:
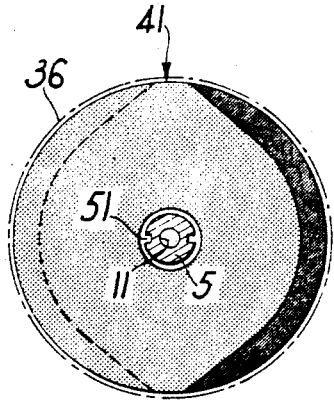

FIG. 3 illustrates the special arrangement which is preferably adopted for the purpose of fitting the assemblies 41 over the guide tube 5. Accordingly, the semipermeable membranes and their supports are cutaway over a small portion of their surface in such a manner that each assembly 41 is applied with respect to the adjacent assembly against two opposite sides of the shell 36, thus forming in the interior of the vessel within the region 22 a staggered passageway between membranes as indicated diagrammatically in the drawing of FIG. 1 by the arrow 56. The positioning of the elements 41 inside the vessel is facilitated by the presence of the ribs 57 of the shell 36, as also shown diagrammatically in the figure.

Finally, the apparatus is completed by a plug 58 which serves to close an opening 59 formed in the vessel wall which is contained in the vessel may be withdrawn form this latter for the purpose of emptying and servicing the apparatus. Said plug can also be fitted with a leakage nozzle 60 having a perfectly calibrated diameter.

The operation of the apparatus is as follows: After assembly of the different elements 41 around the guide tube 5 and assembly of the two end sections 2 and 3 of the vessel by means of the seal plub 7 which is permanently secured in position at 10, the region 22 of the vessel 1 is filled by introducing the solution to be processed through the opening 59 which is normally closed by the plug 58, after having first filled the flexible bag 38 by introducing through the valve 40 a suitable quantity of neutral gas or a mixture of gases. Preferably, the filling gas is carbon dioxide which is admitted into the bag 38 at a pressure which is equal to its saturated vapor pressure at ambient temperature which constitutes the working pressure of the apparatus. Should a higher working pressure prove necessary, a mixture of gases is admitted into the flexible bag such as, for example, carbon dioxide and nitrogen, nitrogen being noncondensable at ambient temperature. The reservoir 32 being also filled with the solution to be processed, the repeated operation of the piston 13 is produced by means of the lever 24. In the position which is illustrated in FIG. 1, it is assumed that the piston 13 is located at the top of its travel; by actuating the lever in the downward direction, the piston is caused to move downwards. Under these conditions, the volume of solution contained within the chamber 17 is driven through the opening 19, the duct 20 and the passageway 21 into the vessel. During this movement, the valve 23 opens to allow the solution to pass through whilst the valve 18 closes and the valve 34 opens. When the lever is moved upwards, the reverse operation takes place, so that the valve 23 and 34 close and the valve 18 opens. The volume of solution contained within the space 16 flows into the chamber 17 and then, during a further downward movement of the piston, is in turn admitted into the interior of the vessel and so on in sequence. The hydrostatic pressure within the vessel increases progressively and initiates by passage of the solution through the holes 39 the progressive filling of the space 37 formed between the shell 36 and the vessel wall: the gas contained in the bag 38 is compressed, whilst the bag decreases in volume and is held in position by the shell 36. When the piston has been actuated a given number of times, the pressure within the vessel is maintained at the constant value which substantially corresponds to the saturated vapor pressure of the gas contained in the bag 38 in the case of a high-purity condensable gas, or increases in the case of a mixture of such a gas with a noncondensable gas and finally attains a pressure which is higher than that of the saturated vapor pressure of the condensable gas alone. Once this pressure is attained, the semipermeable membranes of the assemblies 41 are permittd to work in reverse osmosis and the solution to be processed which is contained in the vessel passes through said membranes from region 22 towards the gaps 46. In the case which is more especially contemplated in which the solution to be processed is sea water or a saturated saline solution of sodium chloride, there is obtained inside the gaps 46 a flow of fresh water which, when collected by the grooves 51 of the guide tube 5, the circular channel 52 and the duct 53, passes out of the apparatus through the opening 54 whilst the saline solution contained in the vessel is simultaneously enriched with salt. On completion of the operation, after withdrawing the plug 58, the apparatus is drained out and a further production cycle is started.

As has been stated earlier, it would also be possible in another mode of operation to provide the plug 58 with a leakage nozzle 60 which permits the continuous discharge from the apparatus of a uniform flow of the supersaturated solution, this leakage flow being in fact comparable with the rate of production of fresh water. The work of compression of the solution which is entailed in this second method is twice as great but avoids the need of draining out the apparatus at the end of each cycle. As has been indicated above, the gas contained in the flexible bag is preferably carbon dioxide, the saturated vapor pressure of which is equal to approximately 1000 p.s.i. In the case of a mixture of carbon dioxide and nitrogen, the pressure within the vessel can be increased to a value of approximately 1400 p.s.i. The semipermeable membranes employed are fabricated of cellulose acetate and fixed on nickel supports formed by electrophotoforming. These membranes are set on their supports by means of an adhesive of the acrylic vinyl type. The thickness of a membrane is approximately 0.2 mm. and is substantially identical with the thickness of the membrane support, each assembly of two associated membranes having a total thickness which is slightly greater than 0.8 mm. The holes formed in the supports have a diameter which varies from 30 microns on the membrane side to 100 microns on the side corresponding to the intermediate gap.

An apparatus according to the invention which has the above characteristics, which has a useful volume for the solution to be processed of approximately 1200 cubic centimeters and a membrane area of 1000 square centimeters and finally which is equipped with a compressible bag having a capacity of approximately 170 cubic centimeters of carbon dioxide at its saturated vapor pressure at ambient temperature, makes it possible to produce approximately 7 liters of fresh water per diem in continuous production cycles comprising an initial pumping stage lasting 2 minutes, a fresh-water production statge lasting 15 minutes followed by a vessel-rinsing stage lasting between 2 and 3 minutes.

Figure 4:
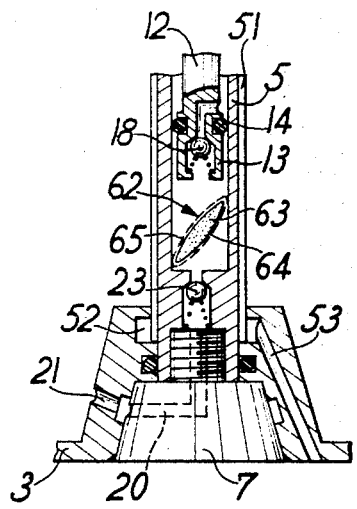
FIG. 4 illustrates an alternative form of construction of the apparatus.

In another mode of operation, it would also be possible to provide a system which entails practically no effort on the part of the user, in contradistinction to the examples described in the foregoing, in which the user has to operate the compression piston a fairly large number of times. Accordingly, and as is shown in FIG. 4, a cartridge 62 is inserted into the chamber 17 of the guide tube 5 at the beginning of operations. Said cartridge is formed of a substance 63 such as, in particular, calcium hydride which, as it comes into contact with the solution to be processed, reacts with said solution and produces an appreciable quantity of gas. Said substance 63 is surrounded by a matrix 64 which is formed of a fragile material such as glass, for example. The matrix 64 can even be surrounded in turn by a thin film 65 of porous plastic which prevents the dispersion of glass fragments when the glass is broken by the piston 13 or as a result of the pressure which is developed within the chamber 17. In fact, it is merely necessary to actuate the piston once from the bottom upwards in order to shatter the cartridge, the piston being arrested at the top of its travel by a catch 66 which is rigidly fixed to the vessel wall as shown in FIG. 1. By reason of the tight seal which is formed within the chamber 17 by the piston 13, the annular seal 14 and the valve 18, the gas produced as a result of the reaction of the substance 63 escapes through the duct 20 and passes into the region 22 of the vessel so as to compress the bag 38 and the gas contained within this latter. The operation of the apparatus then takes place in exactly the same manner as has been described in detail hereinabove.

It is readily apparent that the invention is not limited to the example of construction which is more especially described and illustrated, in which preference is given to the use of flat membranes of practically circular shape. It would be equally possible to adopt membranes of any other shape, especially of tubular shape, as well as membranes formed of hollow fibers, strips and so forth. Any suitable material other than cellulose acetate could also be employed. The supports could be fabricated of a sintered and porous ceramic material, of textile yarn or fabric, of paper, of metals in the form of tubes or perforated plates, or even of porous plastic materials with or without incorporation of vitreous and porous metallic fibers. Similarly, while the vessel itself is preferably constructed of metallic materials, such materials could be of any other type provided that they are capable of affording resistance to the working pressure of the apparatus.

Finally, it would be possible by way of alternative to operate the apparatus by making use of a cold source during the compression stage so as to lower the temperature of condensation of the gas contained in the compressible bag and then, during the decompression stage corresponding to the working of the membranes in reverse osmosis, to utilize a heat source so as to increase the gas pressure within said bag. Particularly in the case of utilization of the apparatus as a survival unit for shipwrecked persons, the cold source and the heat source are readily provided respectively by sea water and by the surrounding atmosphere.

What we claim is:

1. An apparatus for processing a solution by reverse osmosis comprising a closed vessel, a reservoir for the solution to be processed, a mechanism for admitting said solution into said vessel under pressure, a compressible system accommodating the corresponding increase in volume within said vessel and bringing the pressure within said vessel to a stable operating value, a plurality of semipermeable membranes in contact with said solution within said vessel, a fluid circuit for the recovery and discharge of the processed solution after the passage thereof through said membranes, said vessel consisting of two sections in interfitting relation for assembly of said membranes and the components of the apparatus, a central guide tube in said vessel, a piston in said guide tube at one end thereof, manual means for reciprocating said piston, an opening through said piston, a check valve in said opening, a passage between said reservoir and said tube above said piston, a check valve in said passage, a seal plug closing said guide tube at its other end, an internal duct through said plug communicating with the interior of said vessel for admission of the solution to be processed into said vessel under the action of said piston, a check valve in said duct, said compressible system comprising a leak-tight bag of flexible material within said vessel and filled with a neutral gas under pressure, a cylindrical shell in said vessel forming a space with the interior wall of said vessel, a plurality of small diameter holes in said shell communicating between said vessel and said space, said space containing said leak-tight bag.

2. An apparatus in accordance with claim 1, said guide tube containing a cartridge formed of a substance which reacts with said solution to be processed and which generates an appreciable quantity of gas, said cartridge being enclosed in a matrix which is designed to fracture under the action of said piston.

3. An apparatus in accordance with claim 1, said bag being placed against the internal wall of said vessel and held in position laterally by means of a cylindrical shell which serves as a lining of said wall.

4. An apparatus in accordance with claim 1, said shell being provided in the internal surface thereof with traverse strengthening ribs.

5. An apparatus in accordance with claim 1, said bag being fitted with a filling valve through which said neutral gas is introduced through the wall of said vessel.

6. An apparatus in accordance with claim 1, said neutral gas under pressure having a saturated vapor pressure at ambient temperature corresponding to the pressure which is necessary for initiating reverse osmosis of the solution to be processed through said porous membranes.

7. An apparatus in accordance with claim 1, said neutral gas being a mixture of a condensable gas and a noncondensable gas under the usual conditions of utilization of the apparatus.

8. An apparatus in accordance with claim 1, said vessel having an opening for discharging the solution to be processed, said opening being closed by a plug fitted with an adjustable nozzle.

9. An apparatus in accordance with claim 1, said membranes being mounted on porous supports and associated in pairs with their supports in oppositely facing relation, a space being formed between said supports for the recovery of the processed solution which has passed through said membranes.

10. An apparatus in accordance with claim 1, said membranes being set in staggered relation with respect to the axis of the central guide tube in such a manner as to form therebetween a staggered passageway for the solution to be processed which is contained in said vessel.

11. An apparatus in accordance with claim 1, said membranes being stacked inside said vessel and keyed on the outer surface of said central guide tube, O-ring seals being provided to ensure leak-tightness between said membranes, said guide tube and the spaces formed between the membrane supports with respect to the solution to be processed.

12. An apparatus in accordance with claim 11, said spaces formed between the membrane supports communicating with longitudinal grooves machined in the outer surface of said guide tube, said grooves opening into a channel for collecting the processed solution which passes through the vessel wall.

(References on following page)

References Cited

UNITED STATES PATENTS

| | | | |
|---|---|---|---|
| 718,358 | 1/1903 | Kneuper | 210—416 X |
| 2,353,760 | 2/1944 | Richards | 210—321 X |
| 2,526,656 | 10/1950 | Goetz | 210—416 X |
| 2,473,986 | 6/1949 | Bouth | 210—416 X |
| 3,344,926 | 10/1967 | Barnabe et al. | 210—321 |
| 3,365,061 | 1/1968 | Bray | 210—321 X |

REUBEN FRIEDMAN, *Primary Examiner.*

FRANK A. SPEAR, JR., *Assistant Examiner.*

U.S. Cl. X.R.

210—136, 349, 416, 321